US012647958B2

(12) United States Patent
Munukutla et al.

(10) Patent No.: US 12,647,958 B2
(45) Date of Patent: Jun. 2, 2026

(54) WIRELESS LOCAL AREA NETWORK PERFORMANCE DURING PERIODIC ADVERTISEMENT WITH RESPONSE PROTOCOL

(71) Applicant: Cypress Semiconductor Corporation, San Jose, CA (US)

(72) Inventors: Sandeep Sarma Munukutla, Bangalore (IN); Raghavendra Kencharla, Bangalore (IN)

(73) Assignee: Infineon Technologies Americas Corp., El Segundo, CA (US)

( * ) Notice: Subject to any disclaimer, the term of this patent is extended or adjusted under 35 U.S.C. 154(b) by 339 days.

(21) Appl. No.: 18/407,379

(22) Filed: Jan. 8, 2024

(65) Prior Publication Data

US 2025/0227672 A1    Jul. 10, 2025

(51) Int. Cl.
H04W 72/0453    (2023.01)
H04W 72/56    (2023.01)
H04W 84/12    (2009.01)

(52) U.S. Cl.
CPC ....... H04W 72/0453 (2013.01); H04W 72/56 (2023.01); H04W 84/12 (2013.01)

(58) Field of Classification Search
CPC . H04W 72/0453; H04W 72/56; H04W 84/12; H04W 72/30; H04W 72/569
See application file for complete search history.

(56) References Cited

U.S. PATENT DOCUMENTS

| | | | | |
|---|---|---|---|---|
| 2021/0410137 | A1* | 12/2021 | Jiang | H04L 1/0009 |
| 2022/0038241 | A1* | 2/2022 | Vermani | H04L 5/0053 |
| 2023/0026143 | A1* | 1/2023 | Patil | H04W 72/12 |
| 2024/0381418 | A1* | 11/2024 | Ajami | H04W 74/0816 |

* cited by examiner

*Primary Examiner* — Habte Mered

(57) ABSTRACT

Methods and systems for improving wireless local area network performance during periodic advertisement with response protocol. The disclosed method includes, among other things, receiving, by a wireless local area network (WLAN) sub-system of a wireless device, a signal associated with a sub-event of an advertisement event from a wireless personal area network (WPAN) sub-system of the wireless device, wherein the WLAN sub-system and the WPAN sub-system share a frequency band, determining whether a priority bit associated with the sub-event indicates whether during the sub-event empty payload will be transmitted, and in response to determining that the priority bit indicates that during the sub-event an empty payload will be transmitted, utilizing, by the WLAN sub-system, the frequency band for a predetermined amount of time allocated to the sub-event.

20 Claims, 4 Drawing Sheets

400

```
┌─────────────────────────────┐
│  Responsive to assertion of a RF  │
│  active by a WPAN sub-system,     │
│  access a priority bit register. 410 │
└─────────────────────────────┘
                │
                ▼
        ╱────────────────────╲
       ╱  Does the sub-event , based   ╲
      ╱   on a priority bit in the      ╲
     ╱    priority bit register, intend   ╲
     ╲    to transmit an empty payload? 420 ╱
      ╲                             ╱
       ╲_____╱
    YES │                        │ NO
        ▼                        ▼
┌──────────────────┐    ┌──────────────────┐
│ Utilize the shared│    │ Provide the shared│
│ medium for a      │    │ medium to the WPAN│
│ predetermined time│    │ sub-system for the│
│ allocated to the  │    │ predetermined time│
│ sub-event for WLAN│    │ allocated to the  │
│ communication. 430│    │ sub-event. 440    │
└──────────────────┘    └──────────────────┘
```

FIG. 4

WIRELESS LOCAL AREA NETWORK PERFORMANCE DURING PERIODIC ADVERTISEMENT WITH RESPONSE PROTOCOL

TECHNICAL FIELD

This disclosure relates to wireless devices and, more specifically, to improving wireless local area network performance during periodic advertisement with response protocol.

BACKGROUND

Multiple wireless devices using different communication protocols may share a common wireless medium. For example, Wireless Personal Area Network (WPAN) technologies, including Bluetooth® (BT), Bluetooth® Low Energy (BLE), Zigbee®, infrared, and Wireless Local Area Network (WLAN), including Wi-Fi™ share a common wireless medium in a specific gigahertz (GHz) frequency band.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 4 depicts a flow diagram of an example method for improving wireless local area network performance during periodic advertisement with responses protocol, in accordance with implementations of the present disclosure.

DETAILED DESCRIPTION

Figure 1:
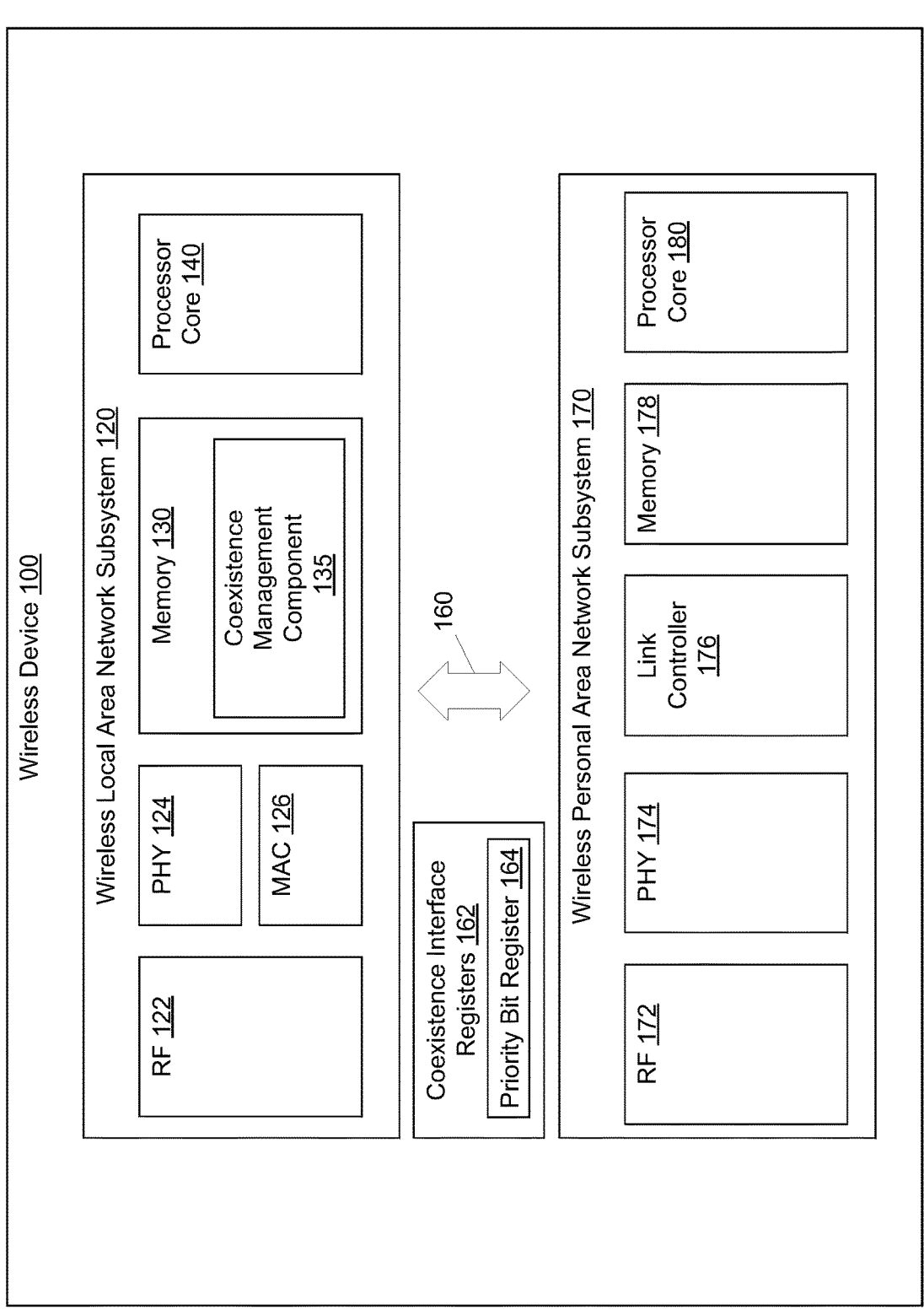
FIG. 1 is a block diagram of an exemplary wireless system, in accordance with implementations of the present disclosure.

Aspects of the present disclosure relate to improving wireless local area network performance during periodic advertisement with response protocol. Co-existence refers to when a WLAN sub-system coexists with another wireless technology (e.g., WPAN sub-system), in a shared environment, possibly on a single piece of hardware or within close proximity. Due to the co-existence of the WLAN sub-system and WPAN sub-system, their corresponding radios may interfere with one another when transmitting data on the same channel or overlapping channels of an Industrial, Scientific, and Medical (ISM) frequency band or other frequency bands (e.g., a shared medium). Increasing passive isolation can enhance co-existence performance, but it comes with a cost in terms of device size, cost, and power consumption. Incorporating more passive isolation becomes increasingly challenging, with the constant strive to shrinking device sizes. Passive isolation is a method of reducing interference between wireless devices by physically separating them or by using shielding materials to block the transmission of radio waves. Typically, time division multiplexing (TDM) is implemented on WLAN and WPAN sub-systems having controllers with low passive isolation to manage co-existence. More specifically, TDM refers to a method of dividing the channel utilized by both the WLAN sub-system and WPAN sub-system into time slots and assigning each device (e.g., WLAN and WPAN sub-system) a specific time slot to transmit. This prevents WLAN and WPAN sub-systems from interfering with each other, even if they are operating on the same radio channel.

In some instances, the WPAN sub-system may use periodic advertisement with responses (PAwR) to establish communication between devices and exchange information. PAwR is an energy-efficient communication technique used in WPAN sub-systems to enable communication between an advertiser and observers with each other without the need for continuous beaconing. An advertisement event (or advertisement event) may be divided into a plurality of sub-events. Each sub-event includes an advertisement phase and a response phase. During the advertisement phase, WPAN sub-system (e.g., the advertiser) transmits an advertisement packet containing a payload. The payload contains all of the necessary information for other devices (e.g., the observers) to identify the advertiser, determine its capabilities, and establish a communication link at the desired data rate. During the response phase, WPAN sub-system listens for response packets after transmitting the advertisement packet. Each sub-event is allocated a predetermined amount of time. This is because PAwR is a time-synchronized protocol, meaning that all WPAN sub-systems must operate on the same clock to ensure that timing of expected advertisement packets and response packets. The specific duration of each sub-event may be defined by the PAwR protocol specification.

In some instances, the payload of the advertisement packet transmitted during an advertisement phase of a sub-event may be a new payload, a previously unacknowledged payload, or an empty payload. The new payload may be used to provide new information or updated information about the advertiser's capabilities. The previously unacknowledged payload may be used to increase the likelihood that other WPAN sub-systems receives the complete payload, especially when the payload contains large amounts of data. The empty payload may be used to announce the presence of the WPAN sub-system to other WPAN sub-systems without transmitting any additional information. During a sub-event in which the advertisement packet contains an empty payload (e.g., an empty payload advertisement packet) is transmitted during the advertisement phase, the WLAN sub-system may utilize a duration of time allocated to the response phase since no response packet is expected from other WPAN sub-systems. This approach provides some benefit; however, WLAN performance may be further improved. In particular, the advertisement phase, during which the empty payload advertisement packet is transmitted, may utilize anywhere from 44 μs-800 μs of the shared medium that could be allocated to the WLAN sub-system.

Aspects and embodiments of the present disclosure address these and other limitations of the existing technology by determining, in response to a request for use of the shared medium by the WPAN sub-system for advertisement events, whether to provide the WPAN sub-system use of the shared medium. For each sub-event of the advertisement event associated with a request to use the shared medium, the WLAN sub-system determines whether a priority bit modifiable by the WPAN sub-system indicates that during the respective sub-event an advertisement packet of the respective sub-event that includes an empty payload will be transmitted. Responsive to determining that the priority bit indicates that during the respective sub-event the advertisement packet of the sub-event that includes an empty payload will be transmitted, the WLAN sub-system does not provide the shared medium to the WPAN sub-system but rather utilizes the shared medium for a predetermined amount of time allocated for the sub-event. Otherwise, the WLAN sub-system provides the shared medium to the WPAN sub-system for the predetermined amount of time allocated for the sub-event.

Aspects of the present disclosure overcome these deficiencies and others by providing other wireless devices, such as WLAN sub-systems, more access to the shared medium when the WPAN sub-system is operating in PAwR, thereby increasing WLAN performance without degrading WPAN sub-system performance.

FIG. 1 is a block diagram of an exemplary wireless device 100, in accordance with implementations of the present disclosure. Wireless device 100 may include a WLAN sub-system 120, a WPAN sub-system 170, and an interface 160 that facilitates coexistence.

WLAN sub-system 120 includes, but is not limited to, a radio frequency front-end circuitry (RF) 122, a physical layer (PHY) 124, a media access control layer (MAC) 126, a memory 130, and a processor 140.

RF 122 is responsible for handling the radio signals involved in WLAN communication. RF 122 is coupled to one or more antennas of the wireless device 100 which receives and transmits radio signals. RF 122 may further include, but is not limited to, a low-noise amplifier (LNA), a power amplifier, one or more filters, and one or more switches. LNA is used to amplify the weak signals received by the antenna without significantly adding to the noise. Power amplifier increases the power of the signal to be sent out through the antenna, ensuring it is strong enough to reach the intended receiver. The one or more filters selects the appropriate frequency bands, such as 2.4 GHz or 5 GHz. The one or more switches alternate between transmission and reception modes in instances where a single antenna is used for both transmitting and receiving. In some embodiments, RF 122 may be a single component for multiple frequency bands or multiple components for each of the frequency bands.

PHY 124 is configured to transmit and receive radio signals over a frequency band (e.g., 2.4 GHz and/or 5 GHz bands). Additionally, PHY 124 is responsible for modulating data bits into a radio signal that can be transmitted, coordinating channel access with other wireless device (e.g., WLAN sub-systems or WPAN sub-systems), and detecting/correcting errors that may occur during transmission. MAC 126 is responsible for managing and maintaining wireless communications, such as, Wi-Fi™. In particular, MAC 126 encapsulates data into frames with specific MAC addresses for transmission and decapsulation, employs protocol to manage medium access and minimize data transmission collisions, implements power-saving protocols to manage the energy use of the network interface, and, among other responsibilities, manages fair bandwidth allocation among all connected devices. Processor 140 is responsible for executing instructions stored in memory 130. The instructions, among other things, manages communication protocols, processing signals, coexistence strategies, etc. Memory 130 includes, but is not limited to, one or more volatile memory and/or non-volatile memory used for store instructions, firmware, operational data, etc.

WPAN sub-system 170 includes, but is not limited to, a RF 172, a PHY 174, a link controller 176, a memory 178, and a processor 180. Processor 180 is responsible for executing instructions stored in memory 178. Memory 178 includes, but is not limited to, one or more volatile memory and/or non-volatile memory.

RF 172, similar to RF 122 of WLAN sub-system 120, is responsible for handling the radio signals involved in WPAN communication (e.g., Bluetooth® (BT), BLE, Zigbee®, Z-wave™, and the like). In some embodiments, RF 172 is coupled to an antenna of the one or more antennas of the wireless device 100 which receives and transmits radio signals. In some embodiments, RF 172 is coupled to an antenna separate and apart from the one or more antennas of the wireless device 100 coupled to RF 122 of WLAN sub-system 120. RF 122 may further include, but is not limited to, a low-noise amplifier (LNA), a power amplifier, one or more filters, and one or more switches. LNA is used to amplify the weak signals received by the antenna without significantly adding to the noise. Power amplifier increases the power of the signal to be sent out through the antenna, ensuring it is strong enough to reach the intended receiver. The one or more filters ensures that the WPAN sub-system 170 operates within its designated frequency band (e.g., 2.4 GHz band) and minimizes interference from other RF sources. The one or more switches alternate between transmission and reception modes in instances where a single antenna is used for both transmitting and receiving.

PHY 174 is configured to transmit and receive radio signals over a frequency band (e.g., 2.4 GHz) to enable wireless communication between other WPAN sub-systems and/or WLAN sub-systems. PHY 174 uses a variety of modulation schemes to achieve specific data rates, and employs various techniques to improve the reliability of the communication, such as error detection and correction, frequency hopping, and time-division duplexing. Link controller 176 implements a link layer of a WPAN protocol stack and is responsible for transmitting and receiving data packets, managing the physical link, and handling errors. Link controller 176 interacts with a link manager, stored in memory 178, used to implement power saving and security aspects of the link layer protocol. Thus, the link manager provides information about the link status and to receive instructions.

WPAN protocol stack includes lower layers implemented by various components of the WPAN sub-system and/or device and higher layers implemented by a host. The lower layers include, for example, the physical layer implemented by PHY 174, and link layer implemented by link controller 176. The higher layers include, for example, a logical link control and adaptation (L2CAP) layer, an attribute protocol (ATT) layer, a generic attribute profile (GATT) layer, a security manager protocol (SMP) layer, and a generic access profile (GAP) layer. L2CAP layer provides crucial services for communication between WPAN sub-systems and/or devices. ATT layer provides a standardized approach to accessing and manipulating data on WPAN sub-systems and/or devices. GATT layer defines a hierarchical structure of attributes, organized into services and characteristics, providing a consistent and organized way to access and manipulate data related to specific WPAN applications. SMP layer safeguards communication between WPAN sub-systems and/or devices by establishing secure connections and protecting data from unauthorized access. GAP layer facilitates basic communication and discovery for sub-systems and/or devices by providing essential services, common features, and advertising and scanning capabilities.

PAwR, as previously described, is implemented by the link layer. In particular, the link layer is responsible for transmitting and receiving periodic advertisement packets and periodic advertisement response packets. The link manager determines when to initiate a periodic advertisement event and sends a command to the link layer. The link layer then generates and transmits a periodic advertisement packet, which includes information about the WPAN sub-system. Other WPAN sub-systems and/or devices can receive the periodic advertisement packet and respond with a periodic advertisement response packet.

Interface 160 refers to a communication protocol used to facilitate coexistence of the WLAN sub-system 120 and the WPAN sub-system 170, especially in situations where the WLAN sub-system 120 and the WPAN sub-system 170 operate in overlapping frequency band (e.g., 2.4 GHz band), herein referred to as "a shared medium." Interface 160, for example, may be a 2-wire serial enhanced coexistence interface (SECI) or 3-wire generic coexistence interface (GCI). Interface 160 serves as communication channels between the WLAN sub-system 120 and the WPAN sub-system 170, allowing them to coordinate their operation. In particular, managing timing of transmissions, power levels, and channel selection.

For example, during use of the shared medium by the WLAN sub-system 120, the WPAN sub-system 170 may assert the RF (e.g., RF 172) as active (i.e., assert RF active (RFA)). Asserting RFA by the WPAN sub-system 170 includes transmitting, via interface 160, a signal associated with an active state set to logical high (1). RFA may be asserted by the WPAN sub-system 170 a predetermined amount of time (e.g., 100 s) prior to any WPAN activity (e.g., transmission and reception of a packet). Once the WPAN activity is completed, RFA may be de-asserted by the WPAN sub-system 170. De-asserting RFA by the WPAN sub-system 170 includes transmitting, via interface 160, a signal associated with an active state set to logical low (0). Once the WPAN sub-system 170 de-asserts RFA, the WLAN sub-system 120 may continue to use the shared medium.

Wireless device 100 may further include a coexistence interface register 162. coexistence interface (GCI) register 162 refers to one or more registers designed to store information associated with the coordination of their operations via interface 160, such as on-going activity of the WLAN sub-system 120 and/or the WPAN sub-system 170.

Memory 130 may include a coexistence management component 135. In some embodiments, the coexistence management component 135 may be stored in any other component of the wireless device 100, or external to the wireless device 100.

Coexistence management component 135, when executed by a processor (e.g., processor 140), in response to assertion of a RFA by the WPAN sub-system for a sub-event of an advertisement event (i.e., a request to utilize the shared medium). Determines whether during the sub-event an empty payload advertisement packet will be transmitted. Coexistence management component 135 determines whether during the sub-event an empty payload advertisement packet will be transmitted by accessing a register of coexistence interface register 162 containing a priority bit (e.g., priority bit register 164). The priority bit in priority bit register 164 indicates whether during the advertisement phase of the sub-event an empty payload advertisement packet will be transmitted. The priority bit stored in the priority bit register 164 may be updated, with the assertion of RFA for each sub-event by the WPAN sub-system, indicating whether the advertisement packet associated with a respective sub-event is an empty payload or not. The priority bit in the priority bit register 164 may be set (e.g., set to logical "1") indicating that during the advertisement phase of the respective sub-event an empty payload advertisement packet will be transmitted (i.e., low priority for the WPAN sub-system 170) or cleared (e.g., set to logical "0") indicating that during the advertisement phase of the respective sub-event a new payload or a previously unacknowledged payload will be transmitted (i.e., high priority for the WPAN sub-system 170).

Sub-events that are low priority for the WPAN sub-system 170, may indicate to the WLAN sub-system 120 an opportunity to utilize the shared medium for the predetermined amount of time allocated to the sub-events. Accordingly, the WLAN sub-system 120 can utilize the shared medium for the predetermined amount of time allocated to the sub-events.

Figures 2A, 2B:
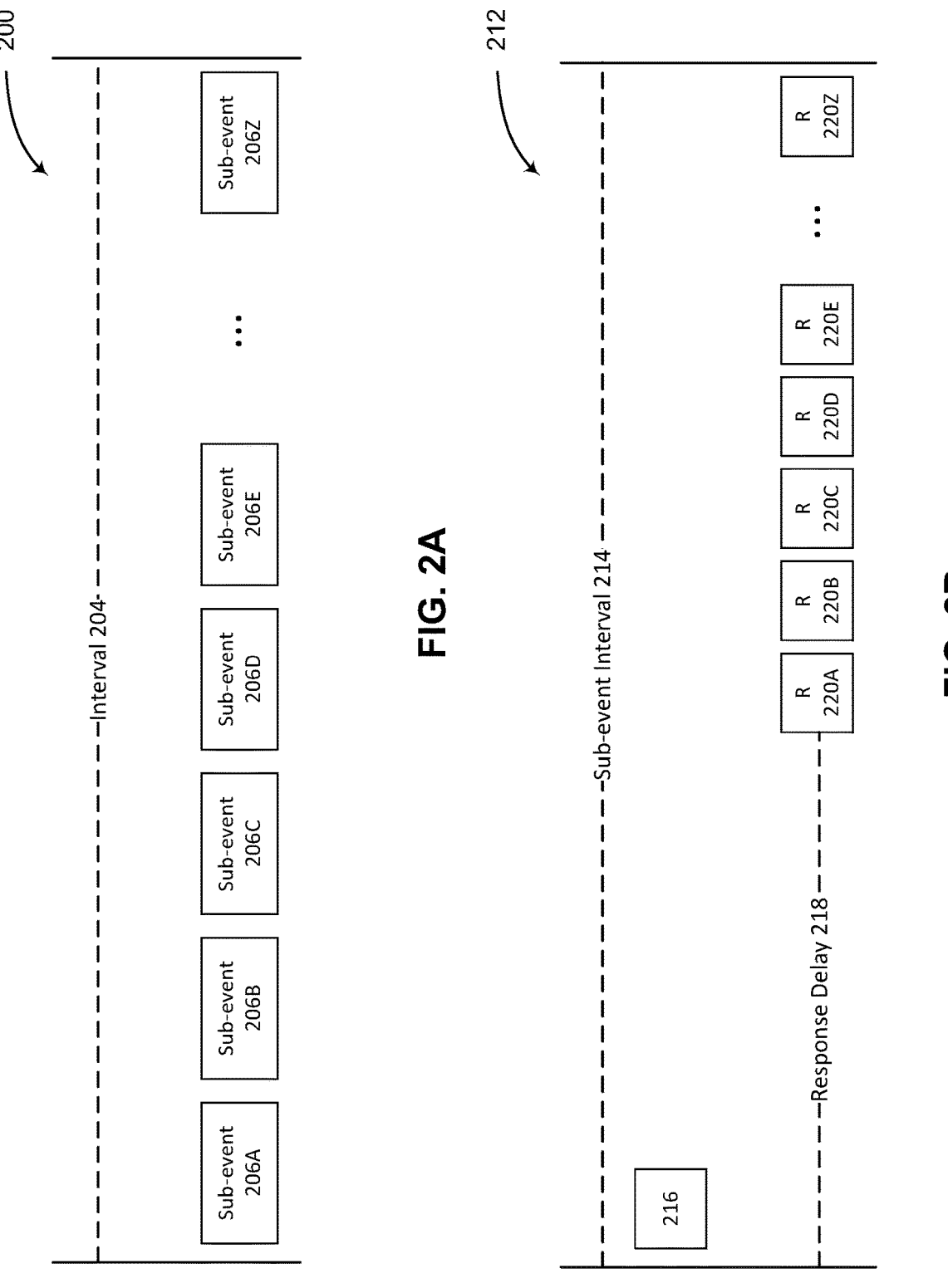
FIGS. 2A and 2B is an exemplary diagram of a periodic advertisement with responses (PAWR) event and sub-event, in accordance with implementations of the present disclosure.

FIG. 2A is an exemplary diagram of a periodic advertisement with response (PAWR) event (e.g., advertisement event 200), in accordance with implementations of the present disclosure. As previously described, the link layer of the WPAN sub-system 170 initiates the advertisement event 200 and is responsible for transmitting and receiving periodic advertisement packets and periodic advertisement response packets. Advertisement event 200 may be divided into a plurality of sub-events (e.g., sub-events 206A-Z) used to establish communication between WPAN sub-systems and exchange information. In some embodiments, advertisement event 200 may take up a time slot (e.g., interval 204) allocated by time division multiplexing (TDM) of a shared medium. Thus, sub-events 206A-Z occur within interval 204.

With reference to FIG. 2B, which is an exemplary diagram of a sub-event 212, similar to each sub-event of sub-events 206A-Z of FIG. 2A. Sub-event 212 is allocated a predetermined amount of time (e.g., sub-event interval 214). Sub-event 212 includes an advertisement phase and a response phase. The advertisement phase is used to transmit periodic advertisement packets and the response phase is used to receive periodic advertisement response packets. The advertisement phase is allocated a first portion of the sub-event interval 214 created by the response delay 218. The response phase is allocated a second portion of the sub-event interval 214 after the response delay 218.

During the first portion of the sub-event interval 214, an advertisement packet 216 is transmitted by a link layer of an advertising WPAN sub-system. As previously described, the advertisement packet 216 includes a new payload, a previously unacknowledged payload, or an empty payload. The link layer of the advertising WPAN sub-system may use the new payload to provide new information or updated information about the advertiser's capabilities. The link layer of the advertising WPAN sub-system may use the previously unacknowledged payload to increase the likelihood that other WPAN sub-systems and/or devices receive the complete payload, especially when the payload contains large amounts of data. The link layer of the advertising WPAN sub-system may use the empty payload to announce the presence of the WPAN sub-system to other WPAN sub-systems and/or devices without transmitting any additional information.

During the second portion of the sub-event interval 214, the link layer of the advertising WPAN sub-system listens for periodic advertisement response packets (e.g., a response packet)(e.g., R 220A-Z) from other WPAN sub-systems and/or devices. If the link layer of the advertising WPAN sub-system receives a response packet, the link layer of the advertising WPAN sub-system will establish a communication link with the responding WPAN sub-system. Each response packet indicates interest in communicating with the advertising WPAN sub-system, and can contain additional information such as the responding WPAN sub-system's capabilities or desired data rate.

Figures 3A, 3B:
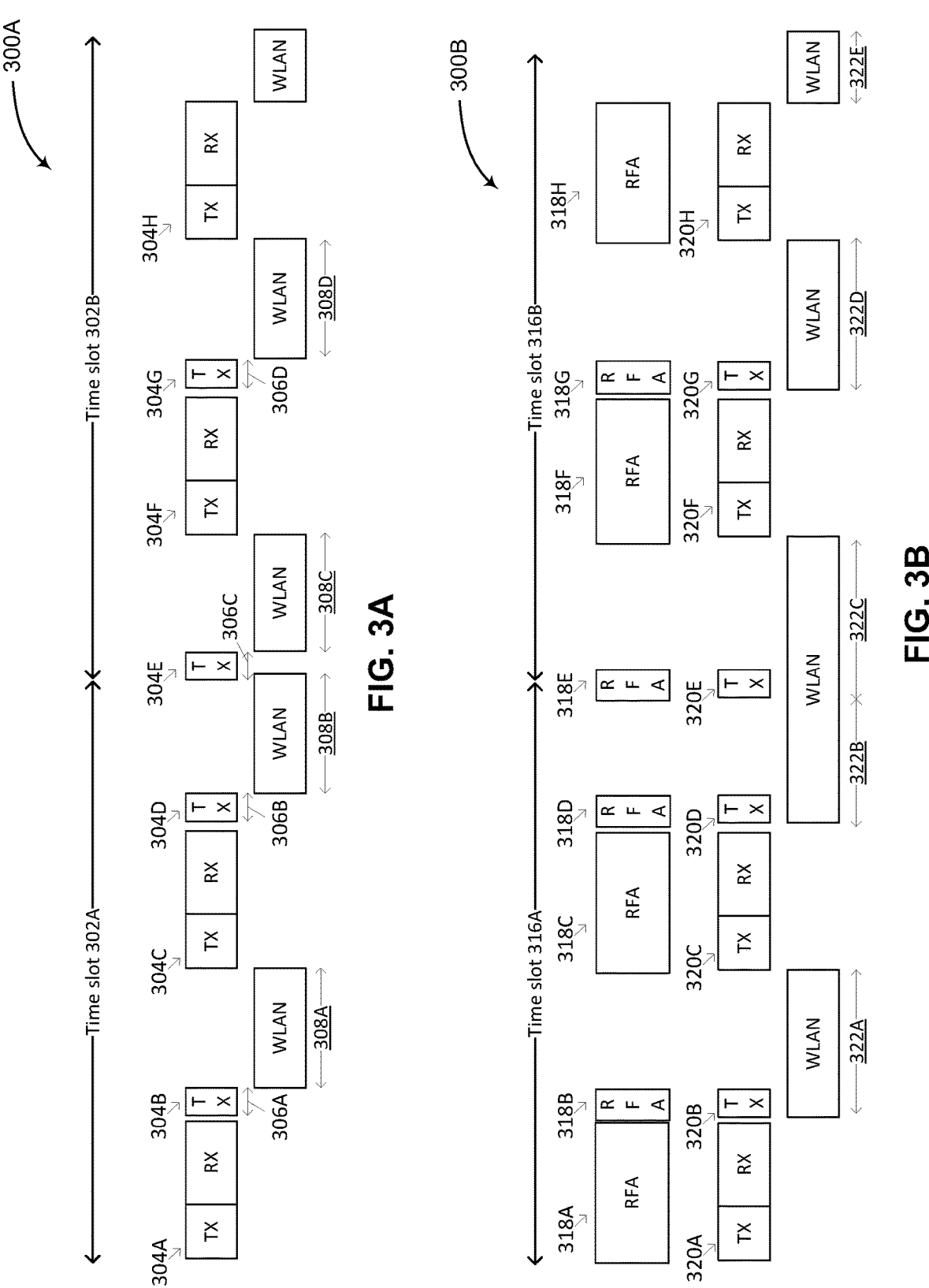
FIGS. 3A and 3B depicts a sub-event over a shared medium, in accordance with implementations of the present disclosure.

FIG. 3A depicts wireless activity over a shared medium 300A without the use of coexistence management component 135 of FIG. 1, in accordance with implementations of the present disclosure. As noted above, shared medium 300A may be divided into a plurality of time slots (e.g., time slot 302A and time slot 302B).

During time slot 302A, the link layer of the WPAN sub-system 170 may initiate an advertisement event on the shared medium 300A. WPAN sub-system 170, in response to a sub-event 304A of the advertisement event, asserts RFA. In response to the assertion of RFA, WLAN sub-system 120 may provide shared medium 300A to the WPAN sub-system 170 for the sub-event 304A. During sub-event 304A, the link layer of the WPAN sub-system 170 transmits an advertisement packet with a non-empty payload. WPAN sub-system 170 listens for response packets from other WPAN sub-systems. WPAN sub-system 170, in response to the completion of sub-event 304A, de-asserts RFA.

WPAN sub-system 170, in response to a sub-event 304B of the advertisement event, asserts RFA. In response to the assertion of RFA, WLAN sub-system 120 may provide shared medium 300A to the WPAN sub-system 170 for the sub-event 304B. During sub-event 304B, the link layer of the WPAN sub-system 170 transmits an advertisement packet with an empty payload. WPAN sub-system 170, in response to the completion of sub-event 304B de-asserts RFA, given the empty payload that does not require WPAN sub-system 170 to listen for response packets. Thus, WLAN sub-system 120 may utilize the shared medium 300A for an amount of time (e.g., time duration 308A) allocated to listening for response packets from other WPAN sub-systems for WPAN communications. However, an amount of time allocated to transmitting the advertisement packet with the empty payload (e.g., time duration 306A) could have been utilized by the WLAN sub-system 120 for WLAN communications.

WPAN sub-system 170, in response to a sub-event 304C of the advertisement event, asserts RFA. In response to the assertion of RFA, WLAN sub-system 120 may provide shared medium 300A to the WPAN sub-system 170 for the sub-event 304C. During sub-event 304C, the link layer of the WPAN sub-system 170 transmits an advertisement packet with a non-empty payload. The link layer of the WPAN sub-system 170 listens for response packets from other WPAN sub-systems. WPAN sub-system 170, in response to the completion of sub-event 304C de-asserts RFA.

WPAN sub-system 170, in response to a sub-event 304D of the advertisement event, asserts RFA. In response to the assertion of RFA, WLAN sub-system 120 may provide shared medium 300A to the WPAN sub-system 170 for the sub-event 304D. During sub-event 304D, the link layer of the WPAN sub-system 170 transmits an advertisement packet with an empty payload. WPAN sub-system 170, in response to the completion of sub-event 304D de-asserts RFA, given the empty payload that does not require WPAN sub-system 170 to listen for response packets. Thus, WLAN sub-system 120 may utilize the shared medium 300A for an amount of time (e.g., time duration 308B) allocated to listening for response packets from other WPAN sub-systems for WPAN communications. However, an amount of time allocated to transmitting the advertisement packet with the empty payload (e.g., time duration 306B) could have been utilized by the WLAN sub-system 120 for WLAN communications.

During time slot 302B, the link layer of the advertising WPAN sub-system 170 may initiate subsequent advertisement event on the shared medium 300A. WPAN sub-system 170, in response to a sub-event 304E of the subsequent advertisement event, asserts RFA. In response to the assertion of RFA, WLAN sub-system 120 may provide shared medium 300A to the WPAN sub-system 170 for the sub-event 304E. During sub-event 304E, the link layer of the WPAN sub-system 170 transmits an advertisement packet with an empty payload. WPAN sub-system 170, in response to the completion of sub-event 304C, de-asserts RFA given the empty payload that does not require WPAN sub-system 170 to listen for response packets. Thus, WLAN sub-system 120 may utilize the shared medium 300A for an amount of time (e.g., time duration 308C) allocated to listening for response packets from other WPAN sub-systems for WPAN communications. However, an amount of time allocated to transmitting the advertisement packet with the empty payload (e.g., time duration 306C) could have been utilized by the WLAN sub-system 120 for WLAN communications. Furthermore, the WLAN sub-system 120 could have utilized the shared medium 300A uninterrupted.

WPAN sub-system 170, in response to a sub-event 304F of the subsequent advertisement event, asserts RFA. In response to the assertion of RFA, WLAN sub-system 120 may provide shared medium 300A to the WPAN sub-system 170 for the sub-event 304F. During sub-event 304F, the link layer of the WPAN sub-system 170 transmits an advertisement packet with a non-empty payload. The link layer of the WPAN sub-system 170 listens for response packets from other WPAN sub-systems. WPAN sub-system 170, in response to the completion of sub-event 304F de-asserts RFA.

WPAN sub-system 170, in response to a sub-event 304G of the subsequent advertisement event, asserts RFA. In response to the assertion of RFA, WLAN sub-system 120 may provide shared medium 300A to the WPAN sub-system 170 for the sub-event 304G. During sub-event 304G, the link layer of the WPAN sub-system 170 transmits an advertisement packet with an empty payload. WPAN sub-system 170, in response to the completion of sub-event 304G de-asserts RFA, given the empty payload that does not require WPAN sub-system 170 to listen for response packets. Thus, WLAN sub-system 120 may utilize the shared medium 300A for an amount of time (e.g., time duration 308D) allocated to listening for response packets from other WPAN sub-systems for WPAN communications. However, an amount of time allocated to transmitting the advertisement packet with the empty payload (e.g., time duration 306D) could have been utilized by the WLAN sub-system 120 for WLAN communications.

WPAN sub-system 170, in response to a sub-event 304H of the subsequent advertisement event, asserts RFA. In response to the assertion of RFA, WLAN sub-system 120 may provide shared medium 300A to the WPAN sub-system 170 for the sub-event 304H. During sub-event 304H, the link layer of the WPAN sub-system 170 transmits an advertisement packet with a non-empty payload. The link layer of the WPAN sub-system 170 listens for response packets from other WPAN sub-systems. WPAN sub-system 170, in response to the completion of sub-event 304H, de-asserts RFA. WLAN sub-system 120 may utilize the remainder of time slot 302B for WLAN communications.

FIG. 3B depicts wireless activity over shared medium 300B, similar to shared medium 300A of FIG. 3A, with the use of coexistence management component 135 of FIG. 1, in accordance with implementations of the present disclosure. Shared medium 300B may be divided into a plurality of time slots (e.g., time slot 314A-D).

During time slot 316A, the link layer of the WPAN sub-system 170 may initiate an advertisement event on the shared medium 300B. WPAN sub-system 170, in response to a sub-event 320A of the advertisement event, asserts RFA 318A. Additionally, WPAN sub-system 170 updates a priority bit in priority bit register 164 of coexistence interface register 162 based on an advertisement packet with a non-empty payload to be transmitted during the sub-event 320A. In particular, clearing the priority bit in priority bit register 164.

Coexistence management component 135 may access the priority bit register 164 updated by the WPAN sub-system 170 to determine whether the priority bit indicates that the sub-event 320A will transmit an advertisement packet with an empty payload. In response to the assertion of RFA and the priority bit indicating that the sub-event 320A will transmit an advertisement packet with a non-empty payload, WLAN sub-system 120 may provide shared medium 300B to the WPAN sub-system 170 for the sub-event 320A. During sub-event 320A, the link layer of the WPAN sub-system 170 transmits an advertisement packet with a non-empty payload. WPAN sub-system 170 listens for response packets from other WPAN sub-systems. WPAN sub-system 170, in response to the completion of sub-event 320A, de-asserts RFA 318A.

WPAN sub-system 170, in response to a sub-event 320B of the advertisement event, asserts RFA 318B. Additionally, WPAN sub-system 170 updates the priority bit in priority bit register 164 based on an advertisement packet with an empty payload to be transmitted during the sub-event 320B. In particular, setting the priority bit in priority bit register 164.

Coexistence management component 135 may access the priority bit register 164 updated by the WPAN sub-system 170 to determine whether the priority bit indicates that the sub-event 320B will transmit an advertisement packet with an empty payload. In response to the assertion of RFA and the priority bit indicating that the sub-event 320B will transmit an advertisement packet with an empty payload, coexistence management component 135 causes the WLAN sub-system 120 to not provide shared medium 300B to the WPAN sub-system 170 for the sub-event 320B. Thus, WLAN sub-system 170 utilizes the shared medium 300B for an amount of time (e.g., time duration 322A) allocated to the sub-event 320B (i.e., an amount of time for transmitting the advertisement packet and listening for response packets).

WPAN sub-system 170, in response to a sub-event 320C of the advertisement event, asserts RFA 318C. Additionally, WPAN sub-system 170 updates a priority bit in priority bit register 164 of coexistence interface register 162 based on an advertisement packet with a non-empty payload to be transmitted during the sub-event 320C. In particular, clearing the priority bit in priority bit register 164.

Coexistence management component 135 may access the priority bit register 164 updated by the WPAN sub-system 170 to determine whether the priority bit indicates that the sub-event 320C will transmit an advertisement packet with a non-empty payload. In response to the assertion of RFA and the priority bit indicating that the sub-event 320C will transmit an advertisement packet with a non-empty payload, WLAN sub-system 120 may provide shared medium 300B to the WPAN sub-system 170 for the sub-event 320C. During sub-event 320C, the link layer of the WPAN sub-system 170 transmits an advertisement packet with a non-empty payload. WPAN sub-system 170 listens for response packets from other WPAN sub-systems. WPAN sub-system 170, in response to the completion of sub-event 320C, de-asserts RFA 318C.

WPAN sub-system 170, in response to a sub-event 320D of the advertisement event, asserts RFA 318D. Additionally, WPAN sub-system 170 updates the priority bit in priority bit register 164 based on an advertisement packet with an empty payload to be transmitted during the sub-event 320D. In particular, setting the priority bit in priority bit register 164.

Coexistence management component 135 may access the priority bit register 164 updated by the WPAN sub-system 170 to determine whether the priority bit indicates that the sub-event 320D will transmit an advertisement packet with an empty payload. In response to the assertion of RFA and the priority bit indicating that the sub-event 320D will transmit an advertisement packet with an empty payload, coexistence management component 135 causes the WLAN sub-system 120 to not provide shared medium 300B to the WPAN sub-system 170 for the sub-event 320D. Thus, WLAN sub-system 120 utilizes the shared medium 300B for an amount of time (e.g., time duration 322B) allocated to the sub-event 320D (i.e., an amount of time for transmitting the advertisement packet and listening for response packets).

During time slot 316B, the link layer of the WPAN sub-system 170 may initiate another advertisement event on the shared medium 300B. WPAN sub-system 170, in response to a sub-event 320E of another advertisement event, asserts RFA 318E. Additionally, WPAN sub-system 170 updates the priority bit in priority bit register 164 based on an advertisement packet with an empty payload to be transmitted during the sub-event 320E. In particular, setting the priority bit in priority bit register 164.

Coexistence management component 135 may access the priority bit register 164 updated by the WPAN sub-system 170 to determine whether the priority bit indicates that the sub-event 320E will transmit an advertisement packet with an empty payload. In response to the assertion of RFA and the priority bit indicating that the sub-event 320E will transmit an advertisement packet with an empty payload, coexistence management component 135 causes the WLAN sub-system 120 to not provide shared medium 300B to the WPAN sub-system 170 for the sub-event 320E. Thus, WLAN sub-system utilizes the shared medium 300B for an amount of time (e.g., time duration 322C) allocated to the sub-event 320E (i.e., an amount of time for transmitting the advertisement packet and listening for response packets). Furthermore, the WLAN sub-system 120 may utilize the shared medium 300B uninterrupted during time duration 322B and time duration 322C since the WPAN sub-system 170 did not need to utilize the shared medium 300B for sub-event 320D and sub-event 320E.

WPAN sub-system 170, in response to a sub-event 320F of another advertisement event, asserts RFA 318F Additionally, WPAN sub-system 170 updates a priority bit in priority bit register 164 of coexistence interface register 162 based on an advertisement packet with a non-empty payload to be transmitted during the sub-event 320F. In particular, clearing the priority bit in priority bit register 164.

Coexistence management component 135 may access the priority bit register 164 updated by the WPAN sub-system 170 to determine whether the priority bit indicates that the sub-event 320F will transmit an advertisement packet with an empty payload. In response to the assertion of RFA and the priority bit indicating that the sub-event 320F will transmit an advertisement packet with a non-empty payload, WLAN sub-system 120 may provide shared medium 300B to the WPAN sub-system 170 for the sub-event 320F. During sub-event 320F, the link layer of the WPAN sub-system 170 transmits an advertisement packet with a non-empty payload. WPAN sub-system 170 listens for response packets from other WPAN sub-systems. WPAN sub-system 170, in response to the completion of sub-event 320F, de-asserts RFA 318F.

WPAN sub-system 170, in response to a sub-event 320G of another advertisement event, asserts RFA 318G. Additionally, WPAN sub-system 170 updates the priority bit in priority bit register 164 based on an advertisement packet with an empty payload to be transmitted during the sub-event 320G. In particular, setting the priority bit in priority bit register 164.

Coexistence management component 135 may access the priority bit register 164 updated by the WPAN sub-system 170 to determine whether the priority bit indicates that the sub-event 320G will transmit an advertisement packet with an empty payload. In response to the assertion of RFA and the priority bit indicating that the sub-event 320G will transmit an advertisement packet with an empty payload, coexistence management component 135 causes the WLAN sub-system 120 to not provide shared medium 300B to the WPAN sub-system 170 for the sub-event 320G. Thus, WLAN sub-system 170 utilizes the shared medium 300B for an amount of time (e.g., time duration 322D) allocated to the sub-event 320G (i.e., an amount of time for transmitting the advertisement packet and listening for response packets).

WPAN sub-system 170, in response to a sub-event 320H of another advertisement event, asserts RFA 318H. Additionally, WPAN sub-system 170 updates a priority bit in priority bit register 164 of coexistence interface register 162 based on an advertisement packet with a non-empty payload to be transmitted during the sub-event 320H. In particular, clearing the priority bit in priority bit register 164.

Coexistence management component 135 may access the priority bit register 164 updated by the WPAN sub-system 170 to determine whether the priority bit indicates that the sub-event 320H will transmit an advertisement packet with an empty payload. In response to the assertion of RFA and the priority bit indicating that the sub-event 320H will transmit an advertisement packet with a non-empty payload, WLAN sub-system 120 may provide shared medium 300B to the WPAN sub-system 170 for the sub-event 320H. During sub-event 320H, the link layer of the WPAN sub-system 170 transmits an advertisement packet with a non-empty payload. WPAN sub-system 170 listens for response packets from other WPAN sub-systems. WPAN sub-system 170, in response to the completion of sub-event 320H, de-asserts RFA 318H. Further, WLAN sub-system 120 may utilize the remainder of time slot 316B (e.g., time duration 322E) for WLAN communications.

FIG. 4 depicts a flow diagram of an example method 400 for improving wireless local area network performance during periodic advertisement with response protocol, in accordance with implementations of the present disclosure. Method 400 can be performed by processing logic that can include hardware (circuitry, dedicated logic, etc.), software (e.g., instructions run on a processing device), or a combination thereof. In one implementation, some, or all of the operations of method 400 can be performed by one or more components of WLAN sub-system 120 of FIG. 1. In some embodiments, some, or all of the operations of method 400 can be performed by coexistence management component 135 of FIG. 1, as described above.

At block 410, in response to assertion of a RF active by a WPAN sub-system, the processing logic accesses a priority bit register. As previously described, the priority bit register is a register in the coexistence interface registers of the wireless device comprising the WLAN sub-system and WPAN sub-system. The WPAN sub-system, in response to initiation of an advertisement event, will assert RFA for each sub-event of the advertisement event. The advertisement event may be divided into a plurality of sub-events. During assertion of the RFA, WPAN sub-system updates a priority bit stored in the priority bit register which indicates whether the advertisement packet associated with a respective sub-event is an empty payload or not.

At block 420, the processing logic determines whether during the sub-event, based on the priority bit in the priority bit register, an empty payload will be transmitted. As previously, the priority bit in the priority bit register may be set (e.g., set to logical "1") indicating that during the advertisement phase of the sub-event an empty payload advertisement packet will be transmitted (i.e., low priority for the WPAN sub-system) or cleared (e.g., set to logical "0") indicating that during the advertisement phase of the sub-event a new payload or a previously unacknowledged payload will be transmitted (i.e., high priority for the WPAN sub-system).

In response to determining that the priority bit is set indicating that during the sub-event an empty payload will be transmitted, at block 430, the processing logic utilizes a shared medium for a predetermined time allocated to the sub-event (or sub-event interval) for WLAN communication. The shared medium may be a frequency band, such as an Industrial, Scientific, and Medical (ISM) frequency band. As previously described, the processing logic does not provide the shared medium to the WPAN sub-system and maintains access to the shared medium for WLAN communication (i.e., the shared medium is not provided to the WPAN sub-system for the sub-event). Thus, WLAN sub-system utilizes the shared medium for an amount of time allocated to the sub-event.

In response to determining that the priority bit is cleared indicating that during the sub-event an empty payload will not be transmitted (i.e., transmit a non-empty payload), at block 440, the processing logic provides the shared medium to the WPAN sub-system for the predetermined time allocated to the sub-event (or sub-event interval). Accordingly, as previously described, the WPAN sub-system transmits, during an advertisement phase, an advertisement packet with a non-empty payload. WPAN sub-system listens, during a response phase, for response packets from other WPAN sub-systems. WPAN sub-system, in response to the completion of the sub-event, de-asserts RFA. In response to de-assertion of the RFA, the processing logic may begin to utilize the shared medium for WLAN communication.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, refer to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer-readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include a collection of data describing a user and/or activities of a user.

In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:

receiving, by a wireless local area network (WLAN) sub-system of a wireless device, a signal associated with a sub-event of an advertisement event from a wireless personal area network (WPAN) sub-system of the wireless device, wherein the WLAN sub-system and the WPAN sub-system share a frequency band;

determining whether a priority bit associated with the sub-event indicates whether during the sub-event an empty payload will be transmitted; and in response to determining that the priority bit indicates that during the sub-event an empty payload will be transmitted, utilizing, by the WLAN sub-system, the frequency band for a predetermined amount of time allocated to the sub-event.

2. The method of claim 1, wherein determining that the priority bit indicates that during the sub-event an empty payload will be transmitted includes:

accessing a priority bit register of the wireless device; and determining whether a priority bit stored in the priority bit register is set.

3. The method of claim 1, wherein determining that the priority bit indicates that during the sub-event an empty payload includes will not be transmitted:

accessing a priority bit register of the wireless device; and determining whether a priority bit stored in the priority bit register is cleared.

4. The method of claim 1, wherein the sub-event is allocated the predetermined amount of time for an advertisement phase of the sub-event and a response phase of the sub-event.

5. The method of claim 4, wherein during the advertisement phase the sub-event transmits one of: a new payload, a previously unacknowledged payload, or an empty payload.

6. The method of claim 1, wherein the signal is an assertion of a radio frequency of the WPAN sub-system to active indicating a request to utilize the frequency band.

7. The method of claim 6, further comprising:

in response to determining that the priority bit indicates that during the sub-event an empty payload will not be transmitted, providing the WPAN sub-system the frequency band for a predetermined amount of time allocated to the sub-event.

8. A wireless device comprising:

a wireless local area network (WLAN) sub-system comprising a processor, and a wireless personal area network (WPAN) sub-system operating on a frequency band shared with the WLAN sub-system, wherein the processor of the WLAN sub-system is to perform operations comprising:

receiving a signal associated with a sub-event of an advertisement event from the WPAN sub-system;

determining whether a priority bit associated with the sub-event indicates whether during the sub-event an empty payload will be transmitted; and in response to determining that the priority bit indicates that during the sub-event an empty payload will be transmitted, utilizing, by the WLAN sub-system, the frequency band for a predetermined amount of time allocated to the sub-event.

9. The wireless device of claim 8, wherein determining that the priority bit indicates that during the sub-event an empty payload will be transmitted includes:

accessing a priority bit register of the wireless device; and determining whether a priority bit stored in the priority bit register is set.

10. The wireless device of claim 8, wherein determining that the priority bit indicates that during the sub-event an empty payload will not be transmitted includes:

accessing a priority bit register of the wireless device; and determining whether a priority bit stored in the priority bit register is cleared.

11. The wireless device of claim 10, wherein the sub-event is allocated the predetermined amount of time for an advertisement phase of the sub-event and a response phase of the sub-event.

12. The wireless device of claim 11, wherein during the advertisement phase the sub-event transmits one of: a new payload, a previously unacknowledged payload, or an empty payload.

13. The wireless device of claim 8, wherein the signal is an assertion of a radio frequency of the WPAN sub-system to active indicating a request to utilize the frequency band.

14. The wireless device of claim 8, wherein the processor of the WPAN sub-system is to perform operations further comprising:

in response to determining that the priority bit indicates that during the sub-event an empty payload will not be transmitted, providing the WPAN sub-system the frequency band for a predetermined amount of time allocated to the sub-event.

15. A wireless local area network (WLAN) sub-system of a wireless device, comprising:

a processor; and a memory comprising a coexistence management component, wherein the coexistence management component when executed by the processor is to perform operations comprising:

receiving a signal associated with a sub-event of an advertisement event from a wireless personal area network (WPAN) sub-system operating on a frequency band shared with the WLAN sub-system;

determining whether a priority bit associated with the sub-event indicates whether during the sub-event an empty payload will be transmitted; and in response to determining that the priority bit indicates that during the sub-event an empty payload will be transmitted, utilizing, by the WLAN sub-system, the frequency band for a predetermined amount of time allocated to the sub-event.

16. The WLAN sub-system of claim 15, wherein determining that the priority bit indicates that during the sub-event an empty payload will be transmitted includes:

accessing a priority bit register of the wireless device; and determining whether a priority bit stored in the priority bit register is set.

17. The WLAN sub-system of claim 15, wherein determining that the priority bit indicates that during the sub-event an empty payload will not be transmitted includes:

accessing a priority bit register of the wireless device; and determining whether a priority bit stored in the priority bit register is cleared.

18. The WLAN sub-system of claim 15, wherein the sub-event is allocated the predetermined amount of time for an advertisement phase of the sub-event and a response phase of the sub-event, and wherein during the advertisement phase the sub-event transmits one of: a new payload, a previously unacknowledged payload, or an empty payload.

19. The WLAN sub-system of claim 15, wherein the signal is an assertion of a radio frequency of the WPAN sub-system to active indicating a request to utilize the frequency band.

20. The WLAN sub-system of claim 19, wherein the coexistence management component when executed by the processor is to perform operations further comprising:

in response to determining that the priority bit indicates that during the sub-event an empty payload will not be transmitted, providing the WPAN sub-system the frequency band for a predetermined amount of time allocated to the sub-event.

* * * * *